June 18, 1957      E. N. PHILLIPS      2,796,587

U. H. F. IMPEDANCE MATCHING MEANS

Filed April 20, 1956      4 Sheets-Sheet 1

INVENTOR.
EDWIN N. PHILLIPS

BY Moody and Goldman

ATTORNEYS

June 18, 1957  E. N. PHILLIPS  2,796,587
U. H. F. IMPEDANCE MATCHING MEANS

Filed April 20, 1956  4 Sheets-Sheet 3

INVENTOR.
EDWIN N. PHILLIPS
BY Moody and Goldman
ATTORNEYS

June 18, 1957  E. N. PHILLIPS  2,796,587
U. H. F. IMPEDANCE MATCHING MEANS
Filed April 20, 1956  4 Sheets-Sheet 4

INVENTOR.
EDWIN N. PHILLIPS
BY Moody and Goldman

ATTORNEYS

United States Patent Office 2,796,587
Patented June 18, 1957

2,796,587

U. H. F. IMPEDANCE MATCHING MEANS

Edwin N. Phillips, Cedar Rapids, Iowa, assignor to Collins Radio Company, Cedar Rapids, Iowa, a corporation of Iowa Application April 20, 1956, Serial No. 579,639

14 Claims. (Cl. 333—33)

This invention relates to means for transducing the impedance between a first coaxial line and a second coaxial line or waveguide to provide a substantially perfect match at any frequency within a frequency range which can be very large.

Conventionally, probes of the loop type or capacity type have been used to connect a transmission line to another transmission line cavity. Actually, the inductive or capacitive probe, as the case may be, is primarily an impedance matching device, which has been used because a more direct means previously has not been found to provide a more efficient transfer of energy in those situations. In effect, the probe attempts to match the impedance of an incoming transmission line to another line, which may be resonant. However, probes are often fixed at the connecting point of a pair of lines. In such case, they are not ideally adapted for use in tunable cavities because they are generally incapable of maintaining desired impedance levels over a large tunable range.

This invention eliminates the necessity for a probe of the conventional type and permits a direct connection between a transmission line and another line or cavity housing while permitting a substantially complete transfer of energy.

In order to impedance match one transmission line to a second line over a large tunable frequency range, there must be provided at least two variables with respect to their connection. One method is to have a fixed point of connection with two properly placed adjustable stubs. One adjustable stub may be connected at the point of line connection, and the other adjustable stub may be fixed to another point on one of the connecting lines.

A second method provides a single adjustable stub at the point of connection between the lines but further requires that the point of connection be adjustable.

The invention provides a unique mechanical arrangement that utilizes the second method, yet avoids any slots in either of the connecting lines to obtain the variable connection point.

Furthermore, the mechanical configuration of the invention avoids transverse positions for the connecting lines and allows an end-to-end connection.

It is, therefore, one object of this invention to provide a direct end-to-end coupling between a coaxial line and a waveguide of larger width to obtain a substantially perfect transfer of energy between them.

It is another object of this invention to provide ultra-high frequency impedance matching means, which can have mechanical simplicity, and which is capable of complete shielding of the propagated waves.

It is a further object of this invention to provide a connection between a transmission line and a cavity housing that avoids conventional fixed probe coupling members, such as, inductive and capacitive probes.

Either of the lines connected by this invention may be terminated in any impedance (reactive, resistive, complex, infinite, or zero). Therefore, although the second line is, at least partly, a cavity or hollow member, it is not necessarily a cavity resonator.

The cavity of the larger line includes two plungers. The first plunger is formed with a large intermediate opening, which may be filled with dielectric material. It has two conductive portions connected respectively to the inner and outer conductors of the smaller line to provide a direct connection between the hollow larger line and the smaller coaxial line. The inner conductor of the connecting small transmission line passes across its dielectric opening.

The first plunger merely provides a slidable means for directly connecting the inner and outer conductors of the smaller coaxial line to the waveguide cavity.

The second plunger is located behind the first plunger and provides a very low impedance across the large line. It is of the type called a shorting plunger. It has an opening which permits the small coaxial line to pass through and may have other openings that may slideably pass rods which may be connected to the first plunger to enable it to be positioned by external actuation.

Adjustable positioning of the first and second plungers provides all of the variables necessary to enable a perfect impedance match between the two connected lines over a frequency range, which is only limited by the amount of movement allowed to the two plungers. Thus, the frequency range may be extremely large, as for example from 200 to 1200 megacycles.

When the larger line is a coaxial cavity, its first plunger member includes an outer annular conductor, an inner annular conductor and may include dielectric means for mechanically securing said inner and outer annular conductors. The outer annular conductor is electrically connected to the inner surface of the outer conductor of the coaxial cavity. And the inner annular conductor of the plunger is electrically connected to the outer surface of the inner conductor of the large diameter coaxial line.

The inner and outer conductors of the large diameter line are extended backwardly to support a second plunger, which is a shorting type made of conducting material.

The small diameter line passes slideably into the coaxial cavity through an opening in the shorting plunger and connects to the first plunger. The outer conductor of the small line may slideably connect to the shorting plunger at all times to prevent radiation through its opening.

The small diameter line connects to the first plunger with its outer conductor connected to the plunger's outer annular conductor; and its inner conductor connected to the first plunger's inner annular conductor.

One or more shafts may be provided to mechanically position the first plunger if the small diameter coaxial line, when rigid, is insufficient for this purpose. Then, the rod or rods may be slideably received through another opening or openings in the shorting plunger. Each of such rods may have one end axially fastened to the dielectric portion of the first plunger to enable mechanical positioning of the first plunger. Another shaft or shafts may be connected to the second plunger to mechanically position it.

The larger of the two connecting lines need not be a coaxial line; but it may be a waveguide of almost any cross-section, although rectangular and circular cross-sections will generally be preferred. Such waveguides do not have inner conductors as do coaxial lines. The first plunger of the invention is formed of conducting material having a periphery that may follow the inner cross-section of the waveguide and also has a relatively large opening through it. The opening may be filled with air or any insulating material or may be evacuated. The second plunger is of the shorting type and may be made of solid conducting material or may have openings sufficiently small to prevent substantial radiation. The peripheries of both plungers electrically connect to the inner waveguide surfaces at microwave frequencies.

The connecting coaxial cable may slideably pass through an opening in the second plunger, and its outer conductor connects electrically to a portion of the first plunger. The inner conductor of the coaxial line passes transversely across the opening in the first plunger and connects electrically to another portion of the first plunger.

Further objects, features and advantages of this invention will be apparent to a person skilled in the art after thorough study of this specification and drawings, in which.

Figure 1:
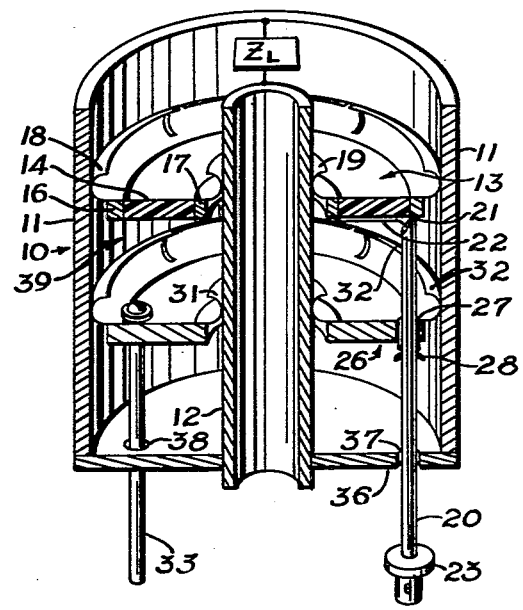
Figure 1 illustrates one form of the invention.

Now referring to the invention in more detail, Figure 1 shows how it may be used to match the impedance between two coaxial transmission lines having substantially different diameters. A large diameter transmission line 10 has an outer conductor 11 and an inner conductor 12; and it is terminated in a load impedance $Z_L$, which connects between its inner conductor 12 and outer conductor 11. Load impedance $Z_L$ may have any value including any amounts of combined resistive and reactive components.

A first plunger 13 is comprised of an annular dielectric member 14, an outer annular conductor 16, and an inner annular conductor 17. One or more slideable contacts 18 are fixed about the outer periphery of dielectric member 14; and they slideably engage the surface of outer conductor 11. In a similar manner, one or more contacting figures 19 are fixed about the inner periphery of dielectric member 14; and they slideably engage the surface of inner conductor 12.

An incoming coaxial transmission line 20 is provided, which has a small diameter compared to the diameter of first coaxial line 10. The maximum diameter of incoming line 20 is limited by the space between the inner and outer conductor of the larger line and by the desired mode of wave energy between the first and second plungers, which will generally be the T. E. M. mode.

Small diameter line 20 in this embodiment is presumed to be rigid. The outer conductor 21 of the small line 20 connects electrically to the outer slideable contacts 18 of first plunger 13. The inner conductor 22 of incoming line 20 extends inwardly and connects to inner contacts 19 of plunger 13.

Thus, a slideable direct connection is provided between the two coaxial lines by first plunger 13, because it directly connects the inner conductors of lines 10 and 20 and directly connects their outer conductors.

Rigid small line 20 is also securely fixed to first plunger 13. Rigid line 20 may be actuated from its exposed end which has a connector 23 to axially position plunger 13 within large line 10.

A second plunger 26, which is made of conducting material, is also received between the inner and outer conductors 11 and 12 of large diameter line 10. Plunger 26 has an opening 27, which slideably receives small transmission line 20. Sliding contacts 28, fixed to plunger 26, are provided about opening 27 and engage the outer conductor of small line 20 in order to prevent radiation from leaving through opening 27.

Also, inner and outer sliding contacts 31 and 32 may be fixed to the respective inner and outer peripheries of shorting plunger 26 to contact the inner and outer conducting surfaces of the large transmission line 10 in order to prevent radiation.

A rod 33 has one end fixed to second plunger 26 and is used to position plunger 26. Although only one positioning rod is shown for each plunger, generally each plunger will have two or three symmetrically placed rods for mechanical symmetry.

An annular supporting member 36 secures inner and outer conductors 11 and 12 of large diameter line 10, and it is formed with openings 37 and 38 through which small coaxial line 20 and rod 33 respectively pass. Member 36 has no primary electrical function in Figure 1, although it will shield any radiation that might escape from second plunger 26.

A flexible coaxial line (not shown) of the same diameter and characteristic impedance of line 20 may be connected to connector 23.

In operation, large diameter coaxial line 10 extends in length from load impedance $Z_L$ to its connection to small diameter line 20 at first plunger 13. This connection is slideable, and accordingly permits the length of large coaxial line 10 to be varied as desired. Large diameter line 20 may be adjusted to provide a standing wave pattern and then will be a cavity resonator. However, this invention is not dependent upon large diameter line 10 being resonant and also comprehends any nonresonant case, since the invention can provide an impedance match in either case.

An adjustable stub 39 is provided between first plunger 13 and second plunger 26 and stub 39 will have a short-circuited end provided by plunger 26. And adjustable stub 39 is at the adjustable connection point between the two transmission lines 20 and 10 provided by first plunger 13.

Figure 2:
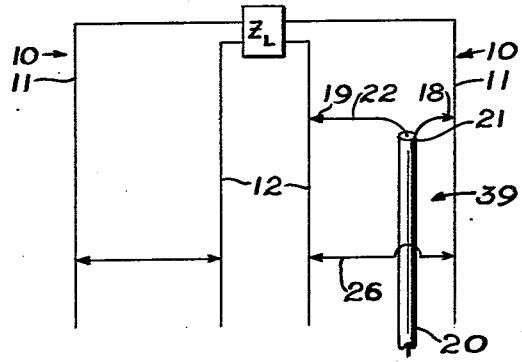
Figure 2 shows the electrical equivalent of the form of the invention shown in Figure 1.

Figure 2 illustrates the electrical analogue of Figure 1. The adjustable direct connection point between transmission lines 20 and 10 is more readily apparent, wherein their inner conductors are connected by slideable point 19 and their outer conductors are connected by slideable point 18. Stub 39 is connected at that point and is variable in length by stub 26 to therefore obtain all of the adjustments necessary to obtain an impedance match between the two lines.

Figure 3:
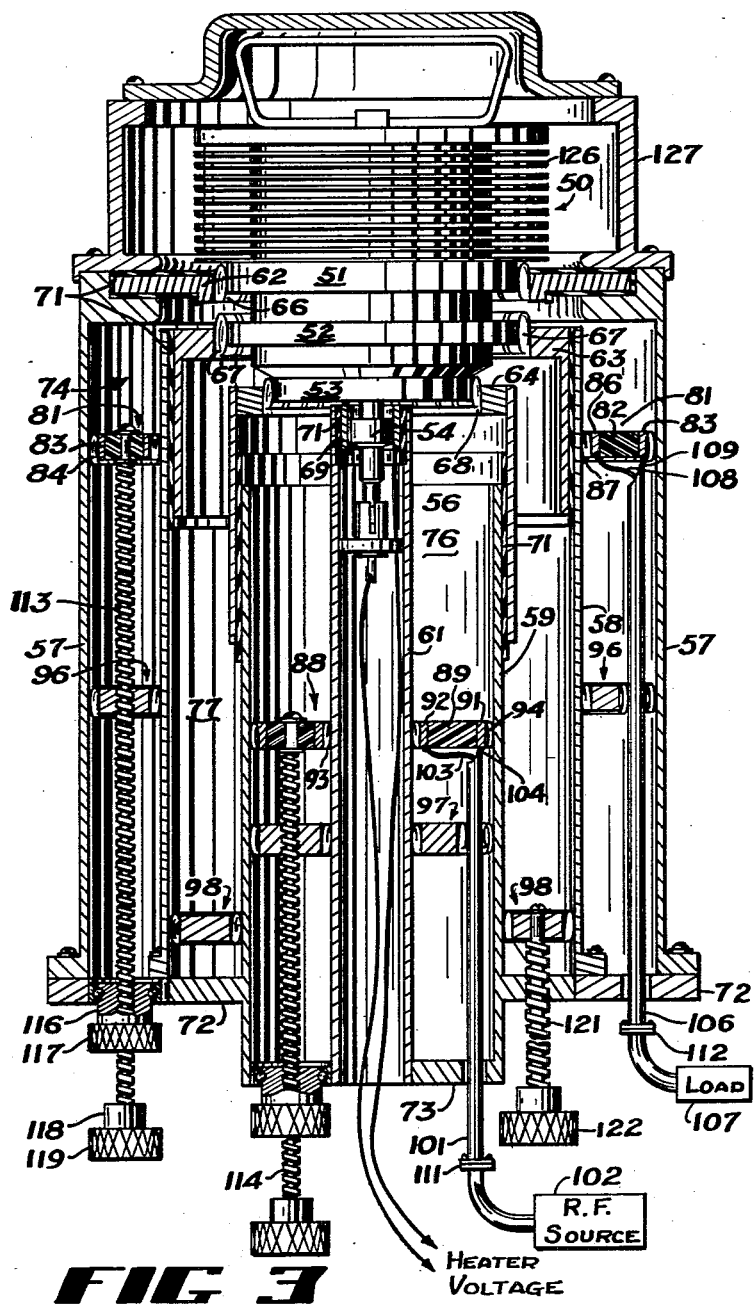
Figure 3 illustrates an ultra-high frequency amplifier utilizing the invention.

Figure 3 illustrates how the invention may be utilized in a tunable ultra-high frequency amplifier to obtain a greater energy output than has heretofore been possible utilizing conventional probe coupling means.

In Figure 3, a tube 50 is used, which may be a planar tetrode. It has a plate contacting surface 51, a screen grid contacting surface 52, a control grid contacting surface 53, a cathode contacting surface 54, and a filament connecting surface 56.

A series of concentric cylindrical members 57, 58, 59 and 60 of conducting material are coaxially positioned, and each has one end respectively connected to a different one of the contacting surfaces of tetrode 50. Shoulder members 62, 63, 64 and 65 of conducting material are respectively fixed in an insulated manner for D. C. purposes at one end of cylindrical members 57, 58, 59 and 61. They have contacts 66, 67, 68 and 69 that respectively engage plate contacting surface 51, screen grid contacting surface 52, control grid contacting surface 53 and cathode contacting surface 54 of tetrode 50. Insulating members 71 separate the cylindrical and shoulder portions of each cylindrical member to enable D. C. biasing of the plate, cathode, and grids of tube 50. However, insulating members 71 do not affect the radio-frequency currents, due to the extremely large capacitance across them.

Annular supporting plates 72 and 73 mechanically support cylinders 57, 58, 59 and 60 in a rigid manner.

The plurality of concentric cylinders permits a series of coaxial cavity arrangements which can utilize the invention.

The cavity housings formed by the coaxial arrangement of the cylinders may be designated as follows: Output cavity housing 74 is between first and second cylinders 57 and 58. Cavity housing 76 is between the third and fourth cylinders 59 and 60. A screen grid cavity housing 77 is between the second and third cylinders 58 and 59. Input housing 76 and output housing 74 utilize this invention. However, screen-grid resonator utilizes a conventional single plunger arrangement, because it has no connecting transmission line.

Output housing 74 encloses a first plunger 81, which is of the same type as first plunger 13 in Figure 1. Thus, plunger 81 is comprised of a dielectric portion 82, an outer annular conductor 83 having spring contacts 84, and an inner annular conductor 86 having spring contacts 87.

Similarly, input housing 76 has a first plunger 88 like plunger 13 in Figure 1 and which is comprised of a dielectric member 89 having inner and outer annular conducting members 91 and 92 with respective spring contacts 93 and 94.

Both input and output housings 74 and 76 also have shorting plungers 96 and 97, respectively, which are basically the same type as described in Figure 1. Shorting plungers 96 and 97 each are annular conducting members having inner and outer spring contacts slidably received against the walls of their respective cylinders.

The plunger 98 in the screen-grid resonator is of the shorting type and may be made of na annular piece of metal with spring contacts on its inner and outer peripheries.

A coaxial input line 101 receives microwave energy from an R. F. source 102 and transmits the energy to input cavity 76. The inner and outer conductors 103 and 104 of input line 101 connect respectively to inner and outer annular conductors 92 and 91 of first plunger 88 to provide a direct connection between the input line 101 and input cavity 76.

An output coaxial line 106 receives amplified microwave energy from output cavity 74 and transmits it to a load 107. The inner and outer conductors 108 and 109 of output line 106 connect respectively to the inner and outer annular conducting members 86 and 83 of plunger 81 to provide a direct connection between output line 106 and output cavity 74.

R. F. source 102 may be prior amplifier, and load 107 may be a final power amplifier or an antenna. Input line 101 and output line 106 are rigid between their respective connectors 111 and 112 and their respective plungers 88 and 81. However, they are flexible, at least in part, between their connectors and their respective source or load.

Each of the plungers shown in Figure 3 may be positioned by a separate rod in the same manner as explained in connection with Figure 1 or with two or three rods per plunger for mechanical symmetry.

However, a unique mechanical system has been devised whereby both plungers of each cavity may be independently positioned utilizing a single rod or set of rods that engage both the first and second plungers. This system is used in Figure 3. A single set of threaded rods (only one rod 113 of the set is shown for clarity) may be utilized to position both the plungers 81 and 96 in the output housing 74. Similarly, the two plungers 88 and 97 in input housing 76 are adjusted by a single set of threaded rods (only one rod 114 of this set is shown for clarity). Each set of rods may include three in order to provide mechanical symmetry. Each of the rods in a set operate identically, and therefore, the drawings will not be unduly complicated by showing all of them.

An end of threaded rod 113 is fixed axially but is rotatable in the dielectric annular member 82 of plunger 81. Rod 113 is threadedly received through shorting plunger 96.

A first actuating member 116 is rotatably supported with ball-bearings in supporting plate 72; and member 116 also threadedly receives rod 116. A knurled knob 117 is part of member 116. A second actuating member 118 with a knurled knob 119 is fastened to the exposed end of rod 113.

The shaft arrangement for adjusting plungers 88 and 97 of input housing 76 is identical to the shaft arrangement for adjusting the plungers in output housing 74.

The amplifier in Figure 3 may be tuned to a given frequency by providing the particular frequency from source 102 and by positioning the plungers until the maximum power output is obtained by load 101. The power output of the amplifier may be sensed by means such as a directional coupler.

Plungers 88 and 97 of input cavity 76 may first be positioned for peak power output. Then, plungers 81 and 96 of output cavity 74 are positioned to further peak the power output. The operation may be repeated one or more times to obtain maximum peaking of the output.

The explanation of the mechanical positioning of the plungers in input housing 76 is identical to the positioning of the plungers in output housing 74. Accordingly, only the operation of the plungers in the output housing will be explained.

Firstly, knurled knob 119 is manually grasped to hold rod 113 rationally stationary. Then knob 117 is rotated, and plungers 81 and 96 are moved axially with fixed spacing to a position where the power output is peaked.

Secondly knob 117 is grasped to hold it rotationally stationary, and second knobs 119 is manually rotated. This will axially move plunger 81 but will not move shorting plunger 96, which will maintain its previously set position. Thus, first plunger 81 is now solely moved until the amplifier output is maximized. The amplifier is then substantially tuned. However, the tuning may be made more exact by repeating the above described sequence two or more times until it is found that further movement of either of the plungers does not provide any increase in the power output of the amplifier.

Input cavity 76 is tuned in a like manner.

In the case where three threaded rods 113 are symmetrically placed, a ring gear (not shown) may be supported coaxially with the cylinders and may engage gears that replace knobs 117 of the three rods. Another ring-gear (not shown) may engage gears that replace knobs 119. Therefore, manual or motor actuation of such ring gears can independently position the plungers in the input and output housings.

Screen grid cavity 77 is tuned by its single plunger 98 which is moved by a threaded rod 121 (or set of threaded rods). Rod 121 is fixed axially but not rotationally to shorting plunger 98 and is threadedly received through annular supporting plate 72. A knurled knob 122 is fixed to the exposed end of rod 121 and is manually rotated to position plunger 98.

Figures 4, 5:
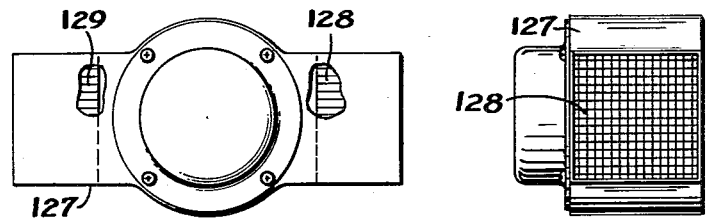
Figure 4 is a top view of the amplifier arrangement in Figure 3.
Figure 5 is an end view of a portion of the amplifier shown in Figure 3.

The upper portion of the tube may be air cooled. The upper portion of tube 50 is provided with fins 126 for this purpose, and they are surrounded by a duct 127 which enables air flow about the tube 50. Figure 4 shows a top view of duct 127.

A pair of honeycomb conducting networks 128 and 129 are supported in the respective ends of the duct 127. Network 128 is seen in an end view of duct 127 in Figure 5. Each opening in the honeycomb network has a width less than $\frac{1}{10}$ of a wavelength at the smallest operating frequency of the tube. Therefore, the openings each act as a waveguide below cutoff to prevent radiation. It has been found that this arrangement attenuates energy, which otherwise would be radiated, by some 80 to 100 decibels, while at the same time permitting a blast of air for cooling the tube. A blower (not shown) may be provided externally to move air by the tube.

Figure 7:
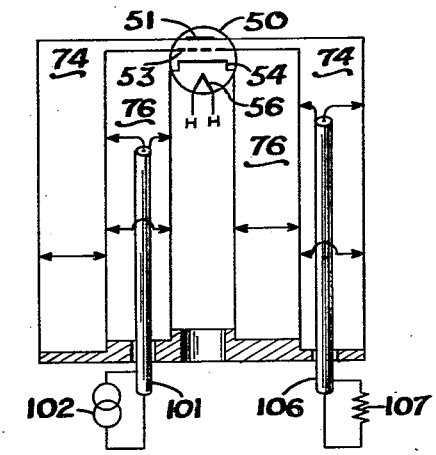
Figure 7 illustrates the electrical operation of an amplifier using this invention; and, Figure 8 is still another illustrative form of the invention.

Figure 7 represents schematically the tuning action provided by the invention for a triode electron discharge tube 50. The schematic representation of Figure 7 also applies to the tetrode arrangement of Figure 3 except that no screen grid or screen grid cavity is included in Figure 7. R. F. source 102, which may be the output of a prior vacuum tube, connects to input cavity 76 by coaxial line 101. A load impedance 107, which might for example be the input to a following amplifier or perhaps an antenna, is connected by another coaxial line 106 to output cavity 74. The similarity of each cavity housing 74 and 76 in Figure 7 to cavity housing 10 in Figure 2 will be noted and their operation is similar.

Figure 6:
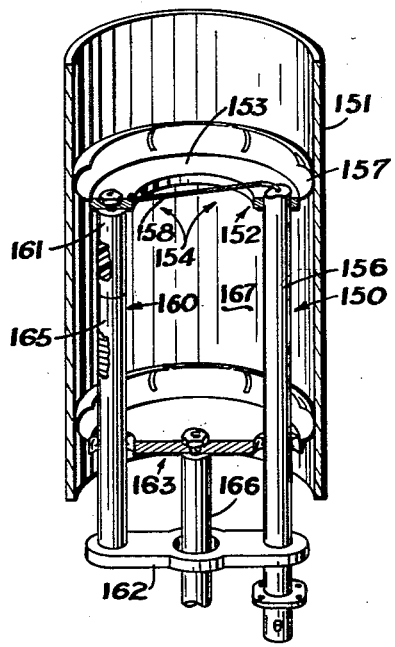
Figure 6 is another illustrative form of the invention.

Figure 6 shows a variation of the invention wherein a relatively small-diameter coaxial line 150 is coupled to a larger diameter circular waveguide 151. This arrangement permits a substantially perfect transfer of energy in either direction between these transmission members.

When wave energy being conveyed from circular waveguide 151 to the coaxial line 150, the invention permits adjustment for shifts in polarization within circular waveguide 151.

On the other hand, when energy is being conveyed from coaxial line 150 to circular waveguide 151, this invention permits precise control over the polarization of energy in the circular waveguide at any point along the waveguide. Consequently, the orientation of polarization at the output end of a circular waveguide can be controlled at its input end by this invention.

Circular waveguide 151 in Figure 6 has a first plunger 152, which has a ring 153 formed with a large opening 154, which may be filled with dielectric, air, or may be evacuated. Coaxial line 150 in Figure 6 is rigid and its outer conductor 156 connects electrically and mechanically in a secure manner to ring 153 which provides a direct connection between cable 150 and waveguide 151. A plurality of spring contacts 157 are fastened around the periphery of conducting ring 153 and engage the inner surface of the circular waveguide 151 to enable good conduction between the coaxial cable and the waveguide.

The inner conductor 158 of coaxial cable 150 extends diametrically across opening 154 in first plunger 152 and connects electrically to the opposite side of ring 153. The $TE_{1,1}$ mode will be coupled between cable 150 and circular waveguide 151.

A rod 160, which may be made of insulating material 161 and of conducting material 165, connects to annular ring 153 at a portion opposite from the connection of coaxial line outer conductor 156. Rod 160 does not have an electrical function but is used to obtain mechanical symmetry for positioning first plunger 152. Thus, the exposed ends of rod 160 and rigid coaxial cable 150 are mechanically connected by member 162 and are actuated together to position first plunger 152 within waveguide 151.

A shorting plunger 163 is also supported in circular waveguide 151 behind first plunger 152. Shorting plunger 163 also has a plurality of spring contacts 164 fastened about its periphery to conductively engage the inner surface of circular waveguide 151. A short-circuited stub 167 of controllable length is then provided between plungers 152 and 163.

Waveguide housing 151 may be terminated at a given distance behind second plunger 163, while allowing for sufficient movement of second plunger 163 to enable tuning over a required frequency range. A rod 166 fastens centrally to second plunger 163 to enable it to be positioned.

The impedance matching operation in Figure 6 is similar to the operation described in connection with Figure 1. Thus, the point of connection between coaxial line 150 and circular waveguide 151 is variable; and also, the length of short circuiting stub 167 is variable.

However, a third variable provided by the form of the invention in Figure 6 becomes significant (important for the $TM_{0,1}$ mode utilized in the connecting coaxial lines). The third variable is rotation of the plungers independently of their axial positions. This permits compensation for variation in the orientation of polarity of the field within the circular waveguide when the $TE_{1,1}$ mode is being coupled from the waveguide to the coaxial line. The third variable was available but often is not important in the configurations of Figures 1 and 3 where the $TM_{0,1}$ mode is most likely used.

Thus, the invention easily overcomes a common difficulty encountered with circular waveguide transmission lines with their sometimes uncontrollable variation in polarization.

In operation, if energy is being transmitted down circular waveguide 151 in Figure 6 in the $TE_{1,1}$ mode, first and second plungers 152 and 163 may be rotated to obtain peaking of the energy received by cable 150. Peaking occurs when inner conductor 158, which passes across plunger 152, is parallel to the electric wave lines received from circular waveguide 150. Hence, adjustment can be made for any polarization variation that may occur over a very large frequency range.

Tuning is further done in the same manner as was stated for Figure 1. The plungers 152 and 163 may be moved relative to each other in an axial manner until peak power is obtained. Then they may be rotated without axial movement until a maximum peak is obtained. This process may be repeated until maximum output is obtained, if it is not obtained during the adjustment. Maximum peaking indicates a substantially perfect impedance match and proper polarization orientation.

Figure 8:
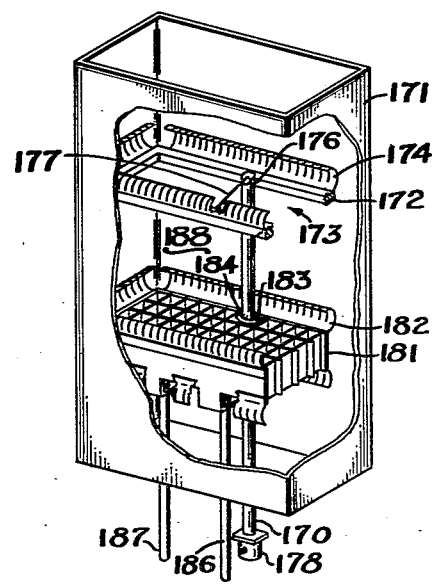

Figure 8 illustrates another form of the invention which provides an impedance match between a small coaxial transmission line 170 and a larger sized rectangular waveguide 171. A double plunger arrangement is used which is basically similar to that shown in Figures 1 and 6, except that a different form of waveguide is used in Figure 8. Rectangular waveguide 171 in Figure 8 may be a transmission line of any length terminating in a given load or may be a resonant line, such as a cavity resonator. Coaxial cable 170 may transmit and/or receive energy with respect to waveguide 171.

A first plunger member 172 is made of conducting material and has a rectangular shape with a large rectangular opening 173 formed throughout its center portion. Air exists in this opening, which is a dielectric medium. Of course, any sort of dielectric medium may be used across opening 173 if its losses are not excessive. First plunger 172 has a plurality of contacting fingers 174 extending on its four sides to slidably engage the inner walls of waveguide 171.

The outer conductor 176 of coaxial cable 170 connects to the central portion of one of the longer sides of first plunger 172. The inner conductor 177 of coaxial cable 170 extends transversely across opening 173 in first plunger 172 and connects centrally to the opposite side of plunger 172.

Coaxial line 170 is rigid and is terminated externally to rectangular housing 171 with a connector 178. Accordingly, first plunger 172 may be mechanically positioned by moving the exposed end of rigid coaxial line 170.

A shorting plunger 181 is provided which is made of a honeycomb metallic network, wherein the openings in the honeycomb are very small compared to the shortest wavelength which may be transmitted by waveguide 171. Also, the honeycomb network is provided with a sufficient depth to enable extreme attenuation of energy received on its active side. Shorting plunger 181 has contacting fingers 182 connected to its four sides to engage the inner walls of the waveguide. Thus, second plunger 181 presents a virtual short circuit across waveguide 171.

Coaxial line 170 is received slideably through an opening 183 in the honeycomb network. Contacting fingers 184 are fixed to the honeycomb network, and these fingers slideably engage the outer conductor of coaxial line 170.

Two rods 186 and 187 are fixed to the lower end of shorting plunger 181 in Figure 8 to provide means for mechanically moving plunger 181. Rods 186 and 187 do not have an electrical function.

The arrangement of Figure 8 provides an impedance match between coaxial line 170 and rectangular waveguide 171 in the same manner that an impedance match is provided between the two different diameter coaxial lines in Figure 1 and the circular waveguide and coaxial line in Figure 6.

Coaxial line 170 in Figure 8 terminates in a variable direct connection with waveguide 171 by means of first plunger 172. Also, the length of a shorted stub 188 provided at the variable connecting point may be varied in length by changing the position of shorting plunger 181 with respect to the connecting point. Hence, all of the necessary variables are provided to obtain a theoretically perfect impedance match between coaxial line 170 and rectangular waveguide 171.

The arrangement in Figure 8 where inner conductor 177 passes centrally across waveguide provides the $TE_{0,1}$ mode of oscillation in the waveguide. Any mode $TE_{0,n}$ may be obtained by providing a number of incoming coaxial lines each connected as shown in Figure 8, except that they are not positioned centrally but are positioned at the maximum response points over the cross-section of the waveguide.

The honeycomb network and opening in second plunger 181 permit a draft of air to be blown through both plungers 181 and 172 to cool any heated devices, such as tubes, within waveguide 171. Honeycomb networks may also be used with the second plungers in Figures 1, 3, and 6, and the dielectrics in the first plungers of Figures 1 and 3 may also have openings to permit air passage.

It is, therefore, realized that this invention can provide a substantially perfect impedance match between two transmission lines having a direct end-to-end connection that conserves space in many situations. The invention permits tuning over a large frequency range while permitting a substantially perfect impedance match at any frequency within its designed range. Thus, with a model of an amplifier of the type shown in Figure 3, tuning has been obtained from 200 to 1200 megacycles. The coaxial arrangement of cavities, which can be used with this invention, permits large savings in space and permits the heated portions of contained vacum tubes to be air cooled through honeycomb shields of conducting material which prevent stray radiation. When the invention is used to couple a coaxial line to circular waveguide, a further adjustment is provided for variation in polarization within the circular waveguide, without adding to the mechanical structure of the invention.

While particular forms of the invention have been shown and described, it is to be understood that the invention is capable of many modifications. Changes, therefore, in construction and arrangement may be made without departing from the scope of the invention as given by the appended claims.

What I claim is:

1. U. H. F. impedance matching means comprising waveguide means, a coaxial transmission line having inner and outer conductors and having a relatively small cross-section in comparison to said waveguide means, said coaxial line terminated within said waveguide means with the terminated outer conductor of said line slideably connecting to one portion of said waveguide means, and the terminated inner conductor of said line slideably connecting to another portion of said waveguide means, and a shorting plunger slideably received within said waveguide means and formed with an opening that slideably receives said coaxial line, whereby axial positioning of said shorting plunger and said terminated end of said line controls the impedance match between said line and waveguide.

2. U. H. F. impedance matching means comprising a waveguide, a coaxial transmission line having inner and outer conductors of relatively small cross-section in comparison to said waveguide, a terminated part of said coaxial line received within a portion of said waveguide, means slideably received within said waveguide, with said means conductively connecting the terminated outer conductor of said line to one portion of said waveguide, and said means also connecting the terminated inner conductor of said line to another portion of said waveguide, and a shorting plunger slideably received within said waveguide and formed with an opening through which said coaxial line slideably passes.

3. U. H. F. impedance matching means comprising a coaxial line, and a much larger diameter coaxial waveguide, each having respective inner and outer conductors, with said coaxial line terminated between the inner and outer conductors of said coaxial waveguide, the outer conductor of said terminated line slideably engaging the inner surface of the outer conductor of said waveguide, the inner conductor of said terminated line slideably engaging the inner conductor of said waveguide, shorting plunger means slideably located between the inner and outer conductors of said waveguide, and said shorting plunger means formed with an opening through which said line slideably passes.

4. U. H. F. impedance matching means comprising a coaxial transmission line having inner and outer conductors, waveguide means having a circular cross-section that is substantially larger than the cross-section of said coaxial line, with said coaxial line terminated within said waveguide means, the outer conductor of said terminated line slideably connected to an inner surface portion of said waveguide, and the inner conductor of said terminated line slideably connected to another inner surface portion of said waveguide, shorting plunger means situated slideably across said waveguide, said shorting plunger means formed with an opening that slideably receives said line.

5. U. H. F. impedance matching means comprising a coaxial transmission line, a waveguide having a rectangular cross-section, with said cross-section being substantially larger than the cross-section of said coaxial line, said coaxial line being terminated within said rectangular waveguide means, the terminated outer conductor of said coaxial line slideably connected to one inner side of said rectangular waveguide, and the terminated inner conductor of said coaxial line slideably connected to another inner side of said rectangular waveguide, shorting-plunger means received internally across said rectangular waveguide, said shorting-plunger means formed with an opening that slideably passes said coaxial line, with the positions of said coaxial line termination and said shorting-plunger means being separately adjustable with respect to their longitudinal positions in said rectangular waveguide.

6. U. H. F. impedance matching means comprising a first coaxial transmission line, and a coaxial waveguide, with said coaxial waveguide having a cross-section much larger than said coaxial line, said coaxial line partly received and terminated between the inner and outer conductors of said coaxial waveguide, a first annular conducting means slideably and conductively connected to the inner surface of said waveguide outer conductor, the outer conductor of said coaxial line being connected to said first annular conducting means, a second annular conducting means slideably and conductively connected to the outer surface of the inner conductor of said coaxial waveguide, the inner conductor of said coaxial line connected to said second annular conducting means, mechanical means for securing together said first and second annular conducting means, a plunger of the shorting type slideably connecting the inner and outer conductors of said coaxial waveguide, said second plunger formed with an opening that slideably passes said smaller coaxial line, with said annular means and said plunger being separately adjustable within said coaxial waveguide.

7. U. H. F. impedance matching means comprising a coaxial transmission line, and a coaxial waveguide, with said waveguide having a substantially larger cross-section than said coaxial line, said coaxial line receivable in part and terminated between the inner and outer conductors of said waveguide; a first plunger comprised of an inner annular-conducting member, an outer annular-conducting member, and dielectric means fixed between said inner and outer annular conducting members, with said outer annular-conducting member slideably connected to the outer conductor of said waveguide, and the inner annular-conducting member slideably connected to the inner conductor of said waveguide, the outer conductor of said coaxial line being connected to said outer annular-conducting member, and the inner conductor of said coaxial line being connected to said inner annular-conducting member, a second plunger of conducting material received between the inner and outer conductors of said waveguide, said second plunger formed with an opening which conductively receives the outer conductor of said coaxial line, said first and second plungers being separately adjustable axially along said waveguide.

8. A U. H. F. amplifier having wide-range tuning means comprising a plurality of coaxially-mounted cylinders of conducting material, an input coaxial waveguide being provided by the annular space between one pair of said cylinders, an output coaxial waveguide being provided by the annular space between another pair of said cylinders, a coaxial vacuum tube received at one end of said plurality of waveguides, with its electrodes operably connected to adjacent ends of said input and output waveguides; an input coaxial line terminated within said input waveguide, an output coaxial line terminated within said output coaxial waveguide, first means slideably connecting the outer conductor of said input coaxial line to the outer conductor of said input waveguide, and second means slideably connecting the inner conductor of said input coaxial line to the inner conductor of said input coaxial waveguide; third means slideably connecting the outer conductor of said output coaxial line to the outer conductor of said output coaxial waveguide, and fourth means slideably connecting the inner conductor of said output coaxial line to the inner conductor of said output coaxial waveguide; an input shorting plunger slideably positioned within said input coaxial waveguide and formed with an opening that slideably passes said input coaxial line; and an output shorting plunger slideably received within said output coaxial waveguide, with said output shorting plunger formed with an opening that slideably passes said output coaxial line; and means for longitudinally positioning said slideable connection means and said shorting plungers within their respective waveguides.

9. A U. H. F. amplifier as in claim 8 including an input-line terminating plunger comprising an outer annular-conducting member that provides said first means, an inner annular-conducting member that provides said second means, and an annular dielectric member fixed between said inner and outer annular-conducting members to secure them, with said outer and inner annular-conducting members slideably and electrically engaging the respective outer and inner conductors of said input coaxial waveguide, the outer conductor of said input coaxial line being connected to said outer annular-conducting member, and the inner conductor of said input coaxial line being connected to said inner annular-conducting member, an output-line terminating plunger comprising an outer annular-conducting member that provides said third means, an inner annular-conducting member that provides said fourth means, and another annular dielectric member fixed between said last-mentioned inner and outer conducting members to secure them together, with said outer and inner annular-conducting members slideably and electrically engaging the respective outer and inner conductors of said output coaxial waveguide, the outer conductor of said output coaxial line being connected to said outer annular-conducting member in the output waveguide, and the inner conductor of said output coaxial line being connected to said inner annular-conducting member in the output waveguide.

10. U. H. F. impedance matching means comprising an input coaxial line, and a circular waveguide, with said waveguide having a large cross-section compared to said coaxial line, said coaxial line being terminated within said waveguide, an annular plunger member of conducting material formed with a large opening and received within said waveguide, with said annular plunger member connected U. H. F.-wise to said circular waveguide, the outer conductor of said coaxial line connected to one portion of said annular plunger member, the inner conductor of said coaxial line connected to another portion of said annular plunger member, a shorting plunger conductively received within said circular waveguide, said shorting plunger being slideable with respect to said circular waveguide and formed with an opening that passes said coaxial line, with said annular plunger member and said shorting plunger being adjustable in their longitudinal and rotational positions to obtain a required impedance match between said line and said circular waveguide.

11. U. H. F. impedance matching means comprising a circular waveguide, and a coaxial line having a substantially smaller cross-section than said circular waveguide, an annular conducting member formed with a large concentric opening, with at least one conducting finger fixed to said annular member and slideably engaging the inner surface of said circular waveguide, said coaxial line having a rigid outer conductor that is electrically and mechanically fastened to said annular conducting member, the inner conductor of said coaxial line passing diametrically across the opening in said annular member and being connected to the opposite side of said member, a shorting plunger received across said circular waveguide, with at least one contacting finger connected to said shorting plunger and slideably engaging the inner surface of said circular waveguide, said shorting plunger formed with an opening that slideably passes said coaxial line, with at least one other contacting finger fixed to said shorting plunger and engaging the outer conductor of said coaxial line, with said annular member and said shorting plunger being separately positioned within said circular waveguide.

12. U. H. F. means for matching a rectangular waveguide to a coaxial line, wherein said waveguide has a substantially larger cross-section than said coaxial line, said coaxial line being terminated within said rectangular waveguide, a rectangular conducting member formed with a large opening, said rectangular member electrically and slideably connected to the inner surface of said rectangular waveguide, the outer conductor of said coaxial line connected to one side of said rectangular member, the inner conductor of said coaxial line being passed across said opening and connected to the opposite side of said rectangular member, a rectangular shorting plunger slideably received within said rectangular waveguide, said rectangular shorting plunger formed with an opening that slideably passes said coaxial line, whereby said rectangular conducting member and said shorting plunger are separately positioned within said waveguide to control the energy flow between said line and waveguide.

13. U. H. F. impedance matching means comprising a rectangular waveguide, and a coaxial transmission line having a substantially smaller cross-section than said rectangular waveguide, a rectangular conducting member received within said waveguide and formed with a large opening, at least one conducting finger fastened to said rectangular member and slideably and electrically engaging the inner surface of said waveguide, the outer conductor of said coaxial line being rigid and electrically and mechanically connected to one side of said rectangular member, the inner conductor of said coaxial line passing across said opening and connected to the opposite side of said rectangular conducting member, a shorting plunger comprised of a conducting honey-comb network received slideably across said rectangular waveguide, with at least one contacting finger connected to said shorting waveguide and slideably and electrically engaging the inner surface of said rectangular waveguide, said shorting plunger having an opening that slideably passes said coaxial line, with at least one other contacting finger connected to said shorting plunger and slideably and electrically engaging the outer conductor of said coaxial line, and means for separately positioning said rectangular member and said shorting plunger.

14. U. H. F. impedance matching means comprising a rectangular waveguide, and a rigid coaxial line having a relatively small cross-section compared to said rectangular waveguide, a rectangular line-terminating plunger of conducting material formed with a large symmetrically-located rectangular opening, with a plurality of conducting fingers fixed to said terminating plunger and slideably engaging the inner surface of said rectangular waveguide, the outer conductor of said coaxial line fixed centrally to one side of said terminating plunger, the inner conductor of said coaxial line passing centrally across said opening and connected centrally to the opposite side of said terminating plunger, a shorting plunger comprised of a honeycomb conducting network having substantial depth, with a plurality of contacting fingers fastened to said shorting plunger and slideably engaging said rectangular waveguide, said shorting plunger formed with an opening that passes said coaxial line, with at least one other contacting finger connected to said shorting plunger and slideably engaging the outer conductor of said coaxial line, and a rod fastened at one end to said shorting plunger and extending out of said waveguide, with said shorting plunger and line-terminating plunger separately positioned by mechanically actuating in an axial manner said rigid coaxial line and said rod member.

References Cited in the file of this patent
UNITED STATES PATENTS 2,428,287     Linder _____ Sept. 30, 1947